Nov. 3, 1953  M. J. HAPPE  2,657,521
SIDE DELIVERY RAKE SPRING TOOTH
Filed July 3, 1950
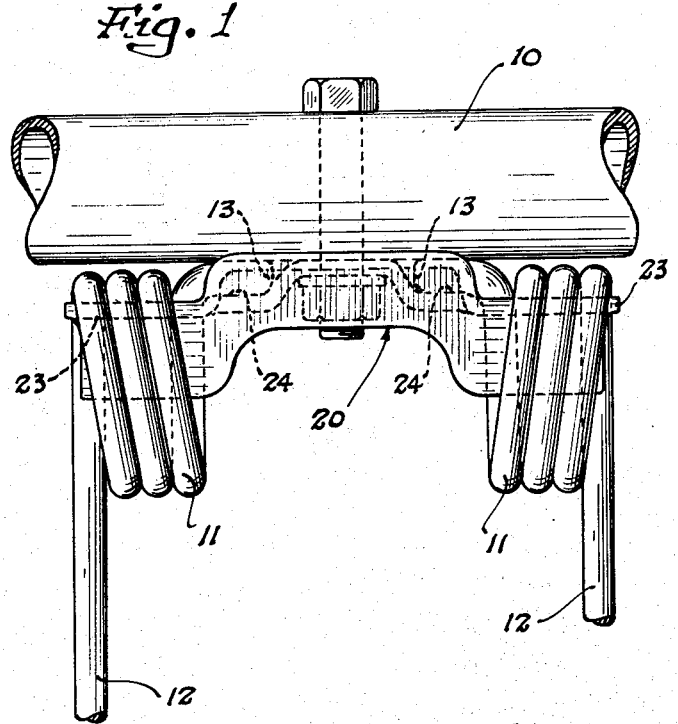
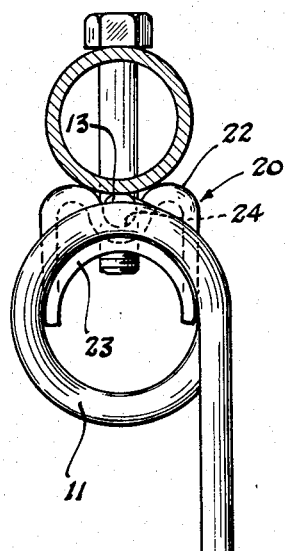
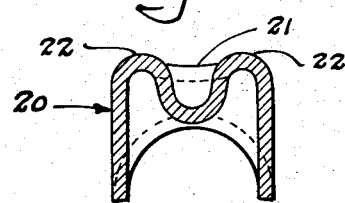
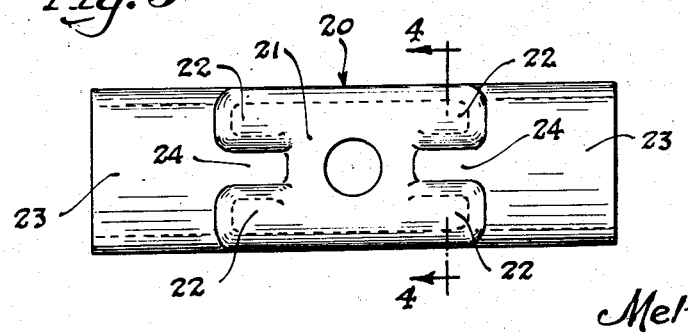
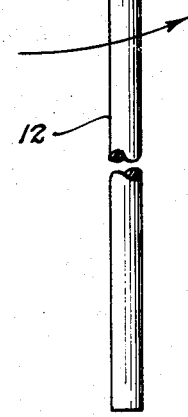
Inventor
Melvin J. Happe
By Allan R. Redrow
Attorney Patented Nov. 3, 1953

2,657,521

UNITED STATES PATENT OFFICE 2,657,521

SIDE DELIVERY RAKE SPRING TOOTH

Melvin J. Happe, New Holland, Pa., assignor to The New Holland Machine Division of the Sperry Corporation, New Holland, Pa., a corporation of Delaware Application July 3, 1950, Serial No. 171,861

4 Claims. (Cl. 56—400)

This invention relates to a resilient form of raking tooth and more particularly to such a spring tooth and mounting means as are especially designed for use on a structure such as the rake bars of the rotating reel of a side delivery rake.

The conventional form of a driven side delivery raking machine makes use of a rotating reel that has several rake bars upon which a number of spring teeth are carried in a manner to be driven over the field to engage the hay whereby to sweep it into a windrow. The improved tooth structure here shown is adapted to cooperate with its mounting on the raking bar of the reel in such a way as to minimize wear on the tooth due to the constant flexing to which it is subjected in use, and it has been provided in order to simplify the tooth and its cooperating mounting structure.

The side rake tooth structure here shown embodies a simple shape or design that is mounted in a way as to always be urged into a firm engagement with its mounting whereby each of the fingers are positively held in position. The mounting means includes a support for the spring coil to position the teeth relative to the rake bar, and the raking fingers all extend downwardly in the same direction from their respective mounting means. Each tooth has a stub end extending outwardly from the coil which is adapted to be pressed against the raking bar by the mounting means.

The preferred form of this tooth structure is shown in drawings wherein:

Figure 1 is an elevation of a portion of a raking bar as if looking forwardly toward the bar from the rear end of a side delivery rake;

Figure 2 is an end view of the structure shown in Figure 1;

Figure 3 is a top plan view of the clip or mounting means for holding two complementary teeth on the raking bar; and Figure 4 is a view taken on line 4—4 of Figure 3.

As represented in the drawings, the raking bar 10 is adapted to be carried in the rotating reel of a conventional side delivery rake, the structure and operation of which are well understood in the art. The resilient raking tooth means of such a machine is adapted to be carried on the underside of the rake bar and in position to engage the crop as the bar rotates in timed sequence with the rotation of the reel. The several teeth engage the hay or the like to lift it from the field, and in cooperation with the strippers and other portions of rake structure not shown, either forms the hay into windrows or teds the hay for completing the curing process.

Each of the improved tooth structures forming the subject of this invention includes a coil 11, a downwardly projecting rake tooth 12, and a horizontally projecting stub end 13. The stub end has a length to project outwardly from the coil, as is best shown in Figure 1, whereby to be engaged tightly against the underside of the rake bar.

Complementary right and left hand tooth means are provided, as shown in Figure 1, and both teeth are mounted on the opposite sides of the support clip 20, the shape of which is best shown in Figures 3 and 4. The clip is removably fastened rigidly onto the underside of the raking bar as by being bolted thereto, and the saddle 21 holds the clip solidly in alignment with the bar while the ridge elements 22 serve to further brace the clip. The clip has a pair of support wings 23 formed integral therewith, and as is clearly shown in the drawings, the wings are adapted to fit within and support the coil sections of the two teeth.

When the coils are placed on the wings, the stub ends 13 of each of the tooth means, are fitted into the slots 24 formed between the ridges 22 on each side of the support means. The valleys 24 are adapted to fit the stub ends snugly and hold each of these portions of the tooth means firmly seated against the bottom of the raking bar. In this connection, it should be noted that in forming the individual tooth elements, the stub ends 13 are relatively elevated somewhat from the coils so that when the tooth means are placed on a clip and the clip is drawn tight aagainst the rake bar, the stub ends and coil sections are compressed together and are thus somewhat stressed in a manner to hold the teeth tightly mounted between the mounting means and raking bar. Also the slots 24 engage the stub ends to hold them tight and pressed hard against the center of the bottom of the raking bar.

Once a plurality of the complementary tooth structures of this invention are assembled on the raking bars of a side delivery rake, the machine is ready for operation in the normal manner. The rake may be used for either windrowing or tedding a crop and no matter how the reel is rotated, the individual tooth elements are firmly engaged against the raking bar.

When the machine is used for raking, the rake bar moves in the direction of the arrow in Figure 2. The tooth 12 is then bent backwardly around the wing 23 as it is loaded while the stub arm 13 is held tightly against the raking bar. When the loading of tooth 12 is reversed as in tedding, the same holding action is accomplished with respect to the stub arm 13. Thus the structure is perfectly adapted for all uses to which the conventional side rake may be put.

The simplified tooth structure here shown, may be readily replaced whenever an individual tooth element breaks during usage, and because the individual teeth may be replaced, the expense of replacement is kept to a minimum. The structure is so supported with respect to the raking bar, however, that the maximum desired flexibility can be had without any looseness or undue stressing of any portions of the individual tooth elements.

The preferred form of the invention is shown in the drawings, but it is apparent that modifications thereof may occur to those skilled in the art which will fall within the scope of the following claims:

I claim:

1. A plurality of rake tooth means and means for mounting them under the raking bar of a side delivery rake or the like, comprising a plurality of tooth means formed of spring steel with each tooth having a coil section, a raking finger extending downwardly from and at right angles to the longitudinal axis of each one of said coil sections, the other end of each one of said coil sections terminating in a stub end, extending parallel to the axis of the coil section, and a plurality of rigid support means carried under the raking bar to engage each of the coil sections and the stub ends of the tooth means to hold said tooth means relatively fixed thereto, each one of said rigid means including a pair of wing elements to fit within and support the coil sections of said pair of tooth means and said rigid means also having an elongated slot formed in its upper surface, said slot being of a size to tightly fit said stub end and hold it pressed against said raking bar to perform said holding action.

2. The combination with a cylindrical raking bar of a clip having a saddle conformingly seating against said bar and a supporting wing carried by the clip in spaced parallel relation to the bar, said saddle being formed with a groove parallel to the bar and opening toward said wing, a spring coil axially receiving and supported on said wing, a raking finger extending from one end of said coil, a stub arm extending from the other end of said coil parallel to the coil axis, said arm being disposed in said groove and clamped between the clip and the raking bar to thereby prevent either axial or rotary movement of the coil on said wing.

3. The combination with a raking bar of a clip secured to said bar having a saddle conformingly seating against said bar and including a supporting wing carried by the clip in spaced parallel relation to the bar, said saddle being formed with a groove parallel to the bar and opening toward said wing, a spring coil axially receiving and supported on said wing, a raking finger extending from said coil, a stub arm extending from said coil parallel to the coil axis, said arm being disposed in said groove and clamped between the clip and the raking bar to thereby prevent either axial or rotary movement of the coil on said wing.

4. The combination with a raking bar of a clip secured to said bar including a supporting wing carried by the clip in spaced parallel relation to the bar, said clip being formed with a groove parallel to the bar and opening toward said wing, a spring coil axially receiving and supported on said wing, a raking finger extending from said coil, a stub arm extending from said coil parallel to the coil axis, said arm being disposed in said groove and clamped between the clip and the raking bar to thereby prevent axial or rotary movement of the coil on said wing.

MELVIN J. HAPPE.

References Cited in the file of this patent

UNITED STATES PATENTS

| Number | Name | Date |
|---|---|---|
| 410,435 | O'Brian | Sept. 3, 1889 |
| 1,978,717 | Oppenheim | Oct. 30, 1934 |
| 2,364,303 | Martin | Dec. 5, 1944 |
| 2,514,560 | Scranton | July 11, 1950 |

FOREIGN PATENTS

| Number | Country | Date |
|---|---|---|
| 570,786 | France | Jan. 21, 1924 |